July 7, 1942.   G. H. WORRALL   2,288,928
HIGH SPEED FILM MOVEMENT MECHANISM
Filed Feb. 2, 1940   3 Sheets-Sheet 2

Inventor
George H. Worrall.

Attorneys.

Patented July 7, 1942

2,288,928

UNITED STATES PATENT OFFICE 2,288,928

HIGH-SPEED FILM MOVEMENT MECHANISM

George H. Worrall, Los Angeles, Calif., assignor to Mitchell Camera Corporation, West Hollywood, Calif., a corporation of Delaware Application February 2, 1940, Serial No. 316,979

3 Claims. (Cl. 88—18.4)

This invention relates generally to intermittent film movement mechanisms for motion picture cameras and the like, and deals with improvements in intermittent film movement mechanisms of the type disclosed in United States Letters Patent Nos. 1,648,559 and 1,930,723 to George A. Mitchell.

Appreciation of the improvements provided by the present invention requires an understanding of certain characteristics of the movement mechanisms disclosed in the above mentioned Mitchell patents, which will therefore first be considered. Patent No. 1,648,559 discloses an intermittent movement mechanism comprising an oscillative claw arm driven at an intermediate point of its length by a boxed cam and provided at its rearward end with a slide pivot, the forward end of the arm being furnished with the usual claw pin or pins. The cam is of a type commonly used in intermittent film movements, and may be described as being in the form of a circular triangle, which is defined by three major arcs struck from equidistant centers, joined by smaller arcs struck from the same centers, the cam being rotatable on an axis coincident with one of said centers. When I hereinafter have reference to a cam, it will be understood that this type of cam or equivalent is contemplated. This type of film movement is characterized by an exceptionally good claw-pin path, the pins engaging the film perforations along a straight line, thence moving downwardly through an arc of good radius for the film pull down stroke, and then withdrawing from the film along a straight line, following which they move through the return stroke. The lines of movement of the claw pins in engaging and in withdrawing from the film are normal to the film path, and there is little "saw" of the pins on the film, what little sawing does occur being confined to very short intervals just after engagement of the pins with the film and just prior to withdrawal therefrom. This film path is illustrated in Fig. 6 of Patent No. 1,648,559. A consideration of the relationships involved in this movement reveals that the period during which the pull down stroke takes place, referred to 360° of rotation of the driving cam, is equal to 120° plus the total angular swing of the claw arm about the axis of its slide pivot, and may be in the neighborhood of 135°.

Patent No. 1,930,723 discloses a two-arm film movement comprising an oscillatory driving arm and an oscillatory claw arm, the driving arm being operated at a point intermediate its length by an eccentric, and having between that eccentric and the film a slide pivot guide. The rearward or swinging end of the driving arm has pivotally connected thereto the rearward end of the claw arm, and thus has its rearward end driven in a path determined by the motion of the rearward end of the driving arm. The claw arm is further operated and is guided by a slide pivot connection with a second eccentric, which rotates about an axis concentric with the first mentioned eccentric, but is opposed by 180° to the latter. This mechanism has the desirable feature of the use of eccentrics in place of cams with resulting comparative quietness of operation, which is of great importance in a studio sound picture camera, and has a relatively fast pull down as well as an exceptionally good claw pin path for an eccentric operated mechanism. Its pull-down stroke requires approximately 164° of rotation of the driving eccentrics.

A primary object of the present invention is to provide an intermittent film movement mechanism having a film pull down stroke of substantially increased speed.

A further object of the invention is to provide an intermittent film movement mechanism having the desirable claw pin path of the aforementioned cam operated movement but having a substantially increased pull-down speed.

A still further object of the invention is to provide a simplified two-armed type of intermittent mechanism having improved claw pin path characteristics, as well as substantial increase in pull-down speed.

In accordance with the present invention, there is employed two pivotally connected oscillative arms, a driving arm and a claw arm, as in Patent No. 1,930,723, but with a single driving cam of the circular triangle type, which operates on the driving arm. The driving arm is guided and operated like the claw arm in Patent No. 1,648,559, but is reversed end for end, as suggested by Patent No. 1,930,723. This reversed driving arm is operated by a cam working in a box formed in the central portion of the arm, and the end of the arm toward the film race is provided with a slide pivot mounting, so that the end of the arm extending away from the film race describes a motion path exactly similar to the motion path of the claw pins of the intermittent movement of Patent No. 1,648,559. The other oscillative arm (the claw arm) is pivotally connected to the free or swinging end of the driving arm, and is provided with a slide pivot mounting on an axis preferably coincident with the axis of rotation of the cam. In the arrangement disclosed in Patent No. 1,648,559, the film pull-down stroke occurs during an angular rotation of the cam of 120° plus the total angular swing of the claw arm. If it were not for the angular travel of the arm, and the box in which the cam works were held against swinging or tilting, the box would, owing to the nature of the cam employed, be moved between its uppermost and lowermost positions by exactly 120° of rotation of the cam. Because of the angular movement of the arm, however, the cam must rotate through 120° plus the number of degrees of angular travel of the arm in order to lower the arm through its down stroke. On the back stroke, on the other hand, the arm is elevated through 120° minus the number of degrees of its angular travel. The movement mechanism of the present invention reverses these relations by deriving the film pull down stroke from what was the back or return stroke in the aforesaid prior mechanism, with the result that the pull down stroke occurs during 120° minus rather than plus the angular swing of the claw arm.

The invention will be best understood from the following detailed description of a present preferred embodiment thereof, reference for this purpose being directed to the accompanying drawings, in which.

Figure 1:
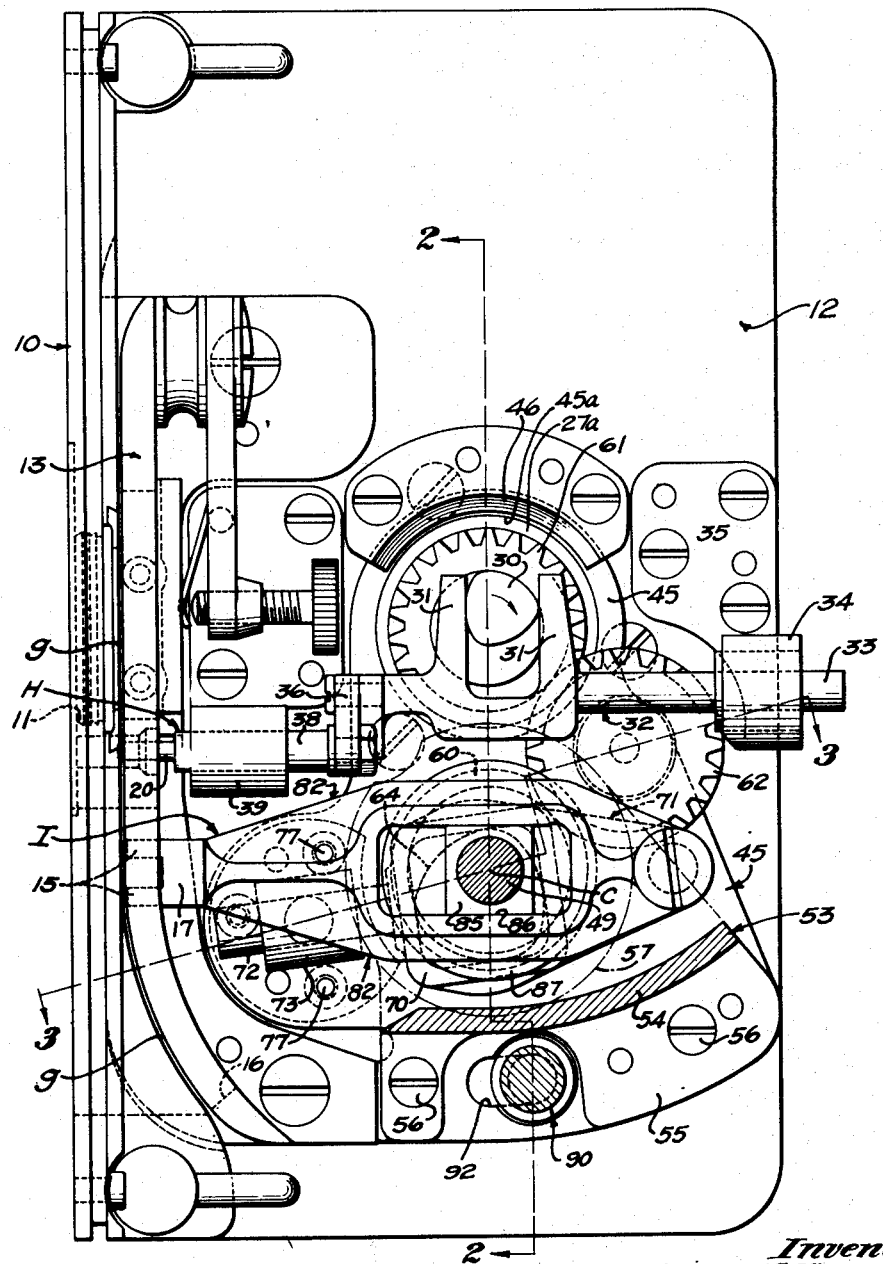
Fig. 1 is a side elevation of an intermittent movement mechanism in accordance with the invention, certain parts being shown in section as indicated by section line 1—1 of Fig. 2.

In the drawings the numeral 10 designates a vertical aperture plate having an exposure aperture at 11, and numeral 12 designates a vertical frame plate arranged at right angles to and extending rearwardly from an edge of plate 10, said plates 10 and 12 being adapted to be mounted in any suitable manner in the motion picture camera, not shown. Mounted immediately to the rear of aperture plate 10 and extending at right angles from plate 12 is a guide plate 13, between which and the aperture plate is the guideway or raceway g for the film F. The film guideway g is vertically disposed except that the lower portion thereof where it is curved rearwardly to conform to the curvature of travel of the claw pins carried by the intermittent movement mechanism, as presently to be described.

The film is moved intermittently in the guideway by intermittent movement mechanism I, while during the period of dwell, that is, alternately with the periods of pull down, the film is engaged by certain film holding or register mechanism H, which registers successive film frames with exposure aperture 11, as later to be described. Movement mechanism I includes two pair of film engaging claw pins 15, which are of proper size and are so spaced as to fit nicely in the film perforations, said pins extending through vertical slots 16 in plate 13 from opposite ends of a cross arm 17 forming a part of the intermittent mechanism. Register mechanism H includes pilot pins 20, which are also of proper size and shape to fit nicely in the film perforations, and are intermittently operated to engage the film alternately with claw pins 15, in such manner that the pilot pins engage the film perforations just before the claw pins are withdrawn therefrom, and are withdrawn from the film just after the claw pins again engage the film.

Figures 2, 3:
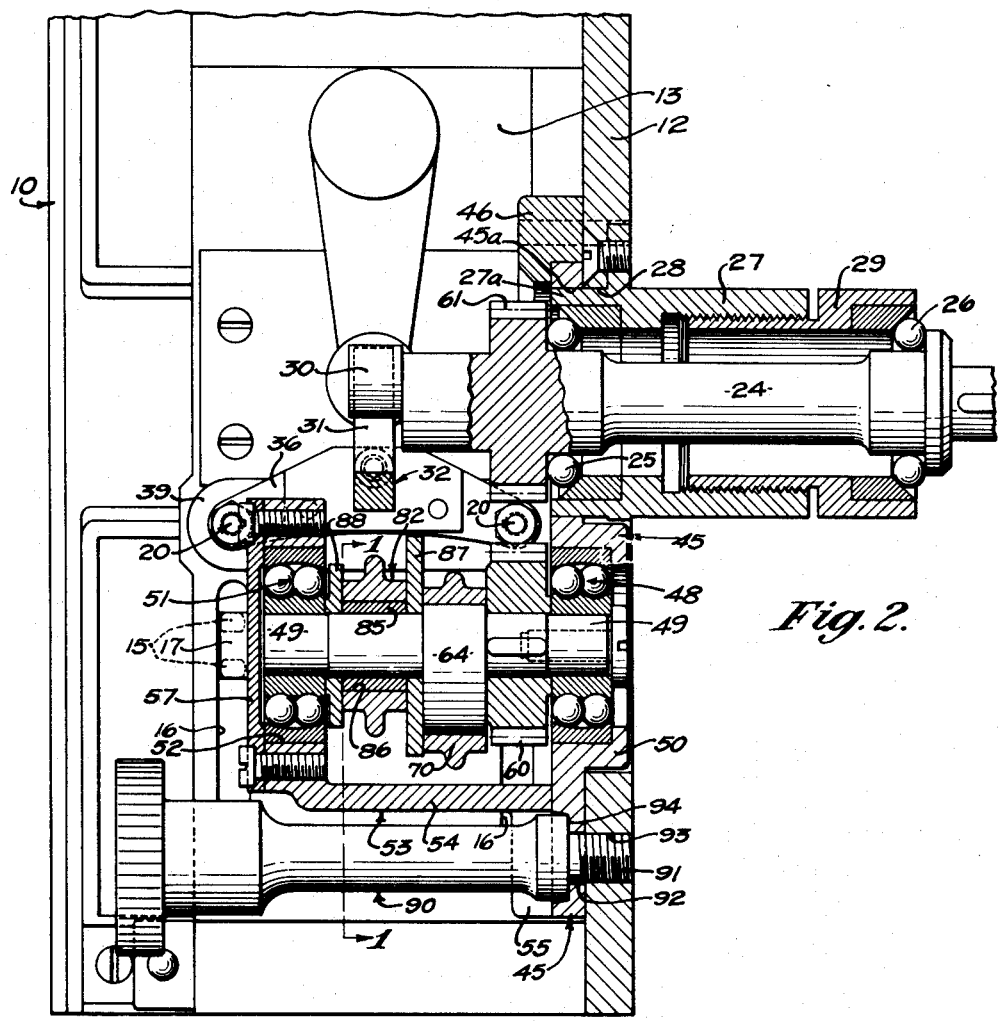
Fig. 2 is a section on broken line 2—2 of Fig. 1.
Fig. 3 is a section on broken line 3—3 of Fig. 1, but with the claw arm and driving arm moved into the plane of the section.

The drive shaft for the movement is indicated at 24 (Fig. 2), journaled in bearings 25 and 26, the former being mounted in a tubular member 27 secured to and extending through an aperture 28 in frame wall 12, and the latter being carried by a tubular member 29 screw-threaded within member 27, all as clearly illustrated in Fig. 2.

On the forward end of drive shaft 24 is a cam 30, which is received between the horizontally spaced projections 31 of a cam follower 32, said follower having a rearwardly projecting shaft 33 slidably received in a bearing 34 carried by a bracket 35 secured to frame plate 12. Secured to the forward end of follower 32 is a cross head 36 on which are mounted cylindrical studs 38 slidably received in bearings 39 and carrying at their forward ends the aforementioned pilot pins 20. The preferred bearing arrangement for these last mentioned parts is the subject matter of my copending application entitled Intermittent film movement mechanism Ser. No. 316,978, filed Feb. 2, 1940, now Patent No. 2,259,849, issued Oct. 21, 1941, in which claims are made to certain construction herein disclosed.

The forward end portion 27a of mounting tube 27 projects forwardly of the forward face of frame plate 12, and rotatably mounted thereon is a carrier member 45, the upper end portion of the latter having a circular aperture 45a to receive end portion 27a of tube 27, in the arrangement clearly illustrated in Fig. 2. Carrier 45 is confined against accidental removal from tube end 27a by means of an overhanging supporting bracket 46 mounted on frame plate 12.

Mounted on carrier 45, at a position below drive shaft 24, is a bearing 48 for a drive shaft 49, carrier 45 having a housing portion 50 for bearing 48 which is received within the aforementioned aperture 28 in vertical frame wall 12 (Fig. 2). The forward end of drive shaft 49 is supported by a bearing 51 mounted in a circular aperture 52 formed in the outer end of a mounting 53 secured to carrier 45. Mounting 53 has a wall 54 projecting outwardly from carrier 45 below shaft 49, and an integral flange 55 secured to carrier 45, as by screws 56. A cover plate 57 secured to mounting 53 over bearing aperture 52 confines bearing 51 in position, in the arrangement clearly appearing in Fig. 2.

Immediately adjacent bearing 48, there is keyed on shaft 49 a gear 60, which in the illustrative embodiment here shown, is driven from a gear 61 on main drive shaft 24 through an idler gear 62 rotatably mounted on carrier 45. It should here be mentioned that use of the idler 62 between gears 61 and 60 is optional and will not in all instances be required; its purpose in the present embodiment is simply to secure the desired direction of rotation for shaft 49 when the movement is installed in one present standard type of motion picture camera.

Formed on shaft 49 immediately adjacent gear 60 is a cam 64, the outline of which is in the form of what may be described as a circular triangle, the latter being defined by three major arcs struck from three equidistant centers, joined by three smaller arcs struck from the same centers. The outline of this cam, which is of a type well known in intermittent film movement practice, is shown most clearly in Fig. 4. This type of cam may be referred to as a circular triangle cam, and for present purposes as well as for the purpose of the claims that expression will be adopted. One of the equidistant centers C from which the defining arcs of the cam are struck (see Fig. 4) is coincident with the axis of shaft 49, and the cam therefore rotates about one of said centers.

Cam 64 works within the square box 70 formed in the intermediate portion of the oscillative driving arm 71 of the movement. The forward portion 72 of said arm 71 is in the form of a cylindrical slide rod which is slidably received within and guided by a pivoted slide bearing block 73, the latter having a pivot stud 74 pivotally mounted within a bushing 75 carried by a mounting 76 secured to carrier 45 as by screws 77 (Fig. 3). Rotation of cam 64 in a right-handed direction as viewed in Figs. 1 and 4, causes arm portion 72 to slide longitudinally in bearing block 73 and to pivot about the axis of said bearing block 73, the swinging end of the rearward portion 80 of arm 71 describing the motion path $m$ indicated in Fig. 4.

Pivotally connected to the rearward end of arm portion 80 is the rearward end of claw arm 82, a stud 83 rotatably mounted in the rearward end portions of the two arms serving as the pivotal connection means.

Figure 4:
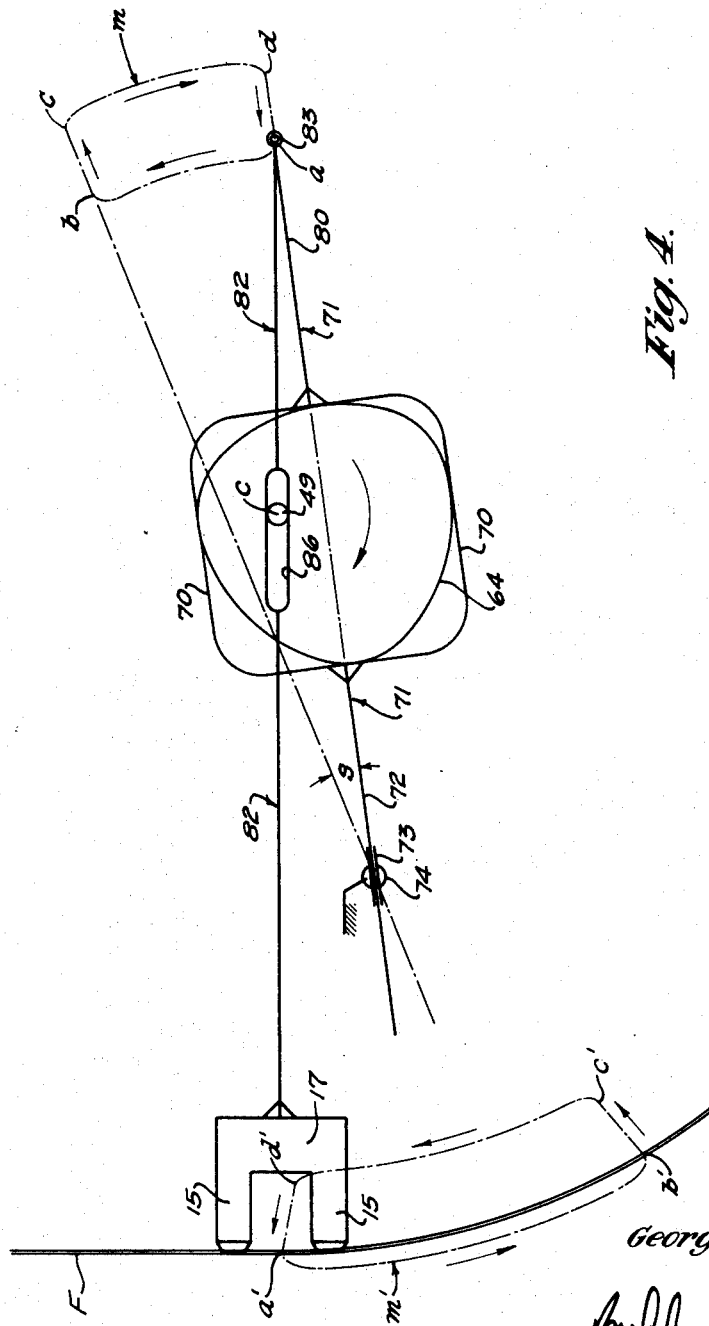
Fig. 4 is a diagram of the movement mechanism of the present invention, showing the character of the claw pin path obtained therewith.

A slide pivot guide is provided for claw arm 82 forwardly of its connection with driving arm 71, and preferably this slide pivot guide consists of a slide block 85 rotatable on shaft 49 and engaging in a longitudinal guide slot 86 formed in the intermediate portion of claw arm 82. Claw arm 82 thus slides along and pivots about a slide pivot element which is preferably co-axial with drive shaft 49. A washer 87 is employed to separate cam 64 and cam box 70 from slide block 75 and the slotted central portion of arm 82, as illustrated in Figs. 2 and 4. Another washer 88 separates slide block 85 and arm 82 from bearing 41. The aforementioned cross head 17 which bears the claw pins 15 is formed or mounted on the forward end of claw arm 82.

The operation of the movement mechanism is as follows: It has already been described how the swinging end of driving arm 71 describes the motion path designated at $m$ in the diagram of Fig. 4. The mechanism is driven in such direction that triangular cam 64 rotates right-handedly as viewed in Figs. 1 and 4, so that the rearward or swinging end of arm 71 travels in an upward direction between the points marked $a$ and $b$ in Fig. 4. From the geometry of the mechanism, cam 64 rotates through 120° minus the number of degrees of angular swing $s$ of arm 71 in thus moving arm 72 between positions $a$ and $b$. The rearward end of claw arm 82, which is pivotally connected to the swinging end of driving arm 71, thus also moves in an upward direction, between positions $a$ and $b$ of movement path $m$, while cam 64 rotates through 120° minus the number of degrees in the total angular swing $s$ of arm 71. In the particular embodiment here illustrated, angle $s$, the total angular swing of arm 71, is approximately 15°, and the rearward end of claw arm 82 therefore moves between positions $a$ and $b$ of movement path $m$ while cam 64 rotates through 120° minus 15°, or in other words through 105° of rotation of the cam.

While the rearward end of claw arm 82 is thus moving between points $a$ and $b$ of motion path $m$, said arm is pivoting on axis C, and its forward or claw end is moving downwardly between corresponding points $a'$ and $b'$ of movement path $m'$. The illustrative mechanism employs a pair of vertically spaced claw pins 15 at each edge of the film, one being positioned above and one below the center line of the claw arm. Fig. 4 does not show the movement path of each of these pins 15, but rather, shows the movement path $m'$ of the center line of the claw arm, which will be understood to be substantially, or in effect, the characteristic path of movement of the forward end of the claw arm.

The forward end of the claw arm thus moves downwardly through its pull down stroke (from position $a'$ to position $b'$) during 105° of rotation of driving cam 64. At position $b'$, the claw arm has reached the end of its pull down stroke, and moves rearwardly from the film, the forward and rearward ends of the claw arm following the movement paths $m'$ and $m$ as shown in Fig. 4. During this withdrawal movement of the claw arm, the claw pins are moving substantially or nearly at right angles to the film, the intermediate portion of the claw arm moving rearwardly on slide block 85. The withdrawal movement of the claw arm terminates at points $c$ and $c'$, the arm swinging through its return path from $c$ to $d$ and from $c'$ to $d'$ by a pivotal action on axis C. The claw arm again engages the film in the course of movement from $d$ to $a$ and from $d'$ to $a'$, the forward end of the claw arm moving nearly at right angles to the film during such engagement movement.

Thus the pull down stroke is reduced to approximately 105° of rotation of driving cam 64, while at the same time a very desirable movement path is achieved for the forward end of the claw arm, the claw pins moving nearly at right angles to the film in engaging and in withdrawing from the film, and having but little "saw" on the film during the pull down stroke. Pilot pin or register mechanism H is so operated and timed as to engage the film perforations just prior to withdrawal of the claw pins therefrom, and to withdraw from the film perforations just after reentry of the claw pins, so that the film is at all times held by either the claw pins or the pilot pins. As previously mentioned, the present illustrative embodiment of the invention is driven from shaft 24, the outer end of which carries the pilot pin operating cam 30, which in this instance is to be understood as rotating in a right-handed direction. To accomplish the desired direction of rotation of movement drive shaft 49, the idler gear 62 is employed, though of course in any instance in which drive shaft 24 rotates in the reverse direction, such an idler would not be employed. The driving relationships between the shafts 24 and 39 carrying cams 30 and 64, respectively, are of course such as will properly synchronize the operation of the pilot pins and claw pins, in such manner that the film is alternately engaged thereby, in the manner previously explained.

Since the pilot pins engage the film just prior to withdrawal of the claw pins therefrom, and withdraw from the film just after reentry of the claw pins, the film is always, normally, engaged by either the pilot pins or the claw pins. To permit convenient threading of the film through the mechanism, provisions are made for withdrawing the claw pins from the film at a time when the pilot pins are withdrawn therefrom. To this end, the carrier 45 for the intermittent mechanism I is swung rearwardly on the forward end portion 27a of mounting tube 27. To clamp carrier member 45 in its normal operating position, there is provided a manually operable screw member 90 having a reduced screwthreaded shank 91 passing through an arcuate slot 92 in the lower portion of carrier 45 for screwthreaded engagement with a tapped aperture 93 in frame plate 12, all as clearly illustrated in Figs. 1 and 2. By tightening this screw member 90, its shoulder 94 bears against carrier 45 and clamps the latter in operating position. When member 90 is loosened, carrier 45 is free to be swung in a rearward direction, and in such movement carries the claw arm clear of the film guideway. It will be observed that this swinging movement of carrier member 45 is concentric with driving gear 61, so that idler gear 62 simply rolls on gear 61 during this operation.

It will be understood that the drawings and description are for illustrative purposes only, and that various changes in design, structure and arrangement may be made without departing from the spirit and scope of the invention or of the appended claims.

I claim:

1. In a film movement, the combination of a frame including means providing a film guideway, a rotatable shaft journalled in said frame to the rear of said guideway, a cam on said drive shaft, the outline of said cam being defined by three major arcs struck from three equidistant centers joined by three smaller arcs struck from the same centers, and the cam being positioned on said shaft with one of said centers coincident with the axis of rotation of said shaft, an oscillatory arm having intermediate its ends a four-sided follower box surrounding said cam, a slide pivot guide between said cam and said guideway for the forward end portion of said oscillatory arm, a claw arm pivotally connected at its rearward end to said oscillatory arm at a point thereon rearwardly of said cam, and a slide pivot element on which said claw arm slides and pivots positioned concentrically with the shaft axis.

2. In a film movement, the combination of a frame including means providing a film guideway, a rotatable shaft journalled in said frame to the rear of said guideway, a cam on said drive shaft, the outline of said cam being defined by three major arcs struck from three equidistant centers joined by three smaller arcs struck from the same centers, and the cam being positioned on said shaft with one of said centers coincident with the axis of rotation of said shaft, an oscillatory arm having intermediate its ends a four-sided follower box surrounding said cam, a slide pivot guide between said cam and said guideway for the forward end portion of said oscillatory arm, a claw arm pivotally connected at its rearward end to said oscillatory arm at a point thereon rearwardly of said cam, a pivot element on said shaft concentric with the shaft axis, and a longitudinal guide slot in said claw arm receiving and working on said pivot element.

3. In a film movement, the combination of a frame including means providing a film guideway, a rotatable shaft journaled in said frame to the rear of said guideway, a cam on said drive shaft, the outline of said cam being defined by three major arcs struck from three equidistant centers joined by three smaller arcs struck from the same centers, and the cam being positioned on said shaft with one of said centers coincident with the axis of rotation of said shaft, an oscillatory arm having intermediate its ends a four-sided follower box surrounding said cam, a slide pivot guide between said cam and said guideway for the forward end portion of said oscillatory arm, a claw arm pivotally connected at its rearward end to said oscillatory arm at a point thereon rearwardly of said cam, and a slide pivot element on which said claw arm slides and pivots positioned between the two ends of the claw arm.

GEORGE H. WORRALL.